Nov. 3, 1964

L. T. BARNES 3,155,887

GAS FILLED TRIMMER CAPACITOR

Filed May 10, 1962

INVENTOR.
LLEWELLYN T. BARNES
BY
Amster & Levy
ATTORNEYS

United States Patent Office 3,155,887
Patented Nov. 3, 1964

3,155,887
GAS FILLED TRIMMER CAPACITOR
Llewellyn T. Barnes, 155 Atlantic Ave., Freeport, N.Y., assignor of one-third to Charles T. Barnes, Freeport, N.Y., and of one-third to John F. Woog, Garden City, N.Y.
Filed May 10, 1962, Ser. No. 193,692
8 Claims. (Cl. 317—245)

This invention relates to variable electrical capacitors and specifically to a capacitor of the gas filled trimmer type which is used to produce precise capacity variations.

Various trimmer capacitors have been devised in the past which are of the type in which a piston constituting a movable electrode is slidable within a cylindrical body made of dielectric material and which has an external fixed electrode. The piston has an internally threaded bore which receives a threaded end of a rotatable adjusting member in such a manner that when the adjusting member is rotated, the piston is moved axially relative to the external electrode, thereby changing the capacitance of the unit. In these prior art capacitors, complicated mechanisms are provided for preventing backlash and for preventing rotation of the piston electrode.

Some of the means used to prevent backlash includes springs or special mounting arrangements which require costly machining. The springs themselves are relatively costly and increase the overall manufacturing cost of the unit and are subject to breakage under heavy use and under adverse weather conditions while the springs may vary in their tension during continuous use.

It is an object of the present invention to provide a trimmer capacitor of the type described in which bellows means are provided to produce a biasing force on the adjusting member to prevent backlash while also serving to eliminate the necessity for special machining of parts for preventing rotation of the piston electrode. The use of the bellows enables the capacitor to be gas filled thereby eliminating moisture and preventing deterioration of the capacitor to assure greatest stability and adaption of the capacitor for use in conjunction with circuits operating in ultra high frequency.

In accordance with an illustrative embodiment of the present invention, there is provided a gas filled trimmer type capacitor having a body in the form of a cylinder of high dielectric material. An adjusting member is journalled in one of the end walls of the hollow cylinder and has an externally threaded portion extending into the cylinder. A cylindrical piston electrode is slidable in the cylinder and has an internally threaded bore which receives the threaded portion and cooperates with an external fixed electrode mounted on the cylinder. A first bellows is secured to one of the end walls and to the piston electrode while a second bellows is secured to a bellows plate and to the piston so that as the adjusting member is rotated the piston electrode is axially moved to compress the first bellows and so that the adjusting member will engage the bellows plate to expand the second bellows. The first bellows serves to prevent rotation of the piston electrode and to prevent backlash. An inert gas such as nitrogen is disposed between the first and second bellows and the cylinder.

A further object of the invention is to provide a piston type gas filled trimmer capacitor which will require a minimum machining to produce and which has great stability.

Another object of the invention is to provide a capacitor of the character described which is economical in manufacture and eliminates the necessity for springs for use in controlling backlash.

A further object of the invention resides in the provision of a capacitor which is arranged to receive an inert gas therein so as to prevent deterioration of the operating parts of the device from moisture and the like thereby assuring great stability and effective operation.

Still further objects and features of this invention reside in the provision of a gas filled trimmer type piston capacitor which is composed of a few parts, is simple to construct and assemble, lends itself to mass production techniques and which includes bellows means effective to prevent rotation of the piston while serving to form a chamber for the inert gas used in the capacitor.

These, together with the ancillary objects and features of the invention which will become apparent as the following description proceeds, are attained by this capacitor, a preferred embodiment of which has been illustrated in the accompanying drawing by way of example only, wherein.

Figure 1:
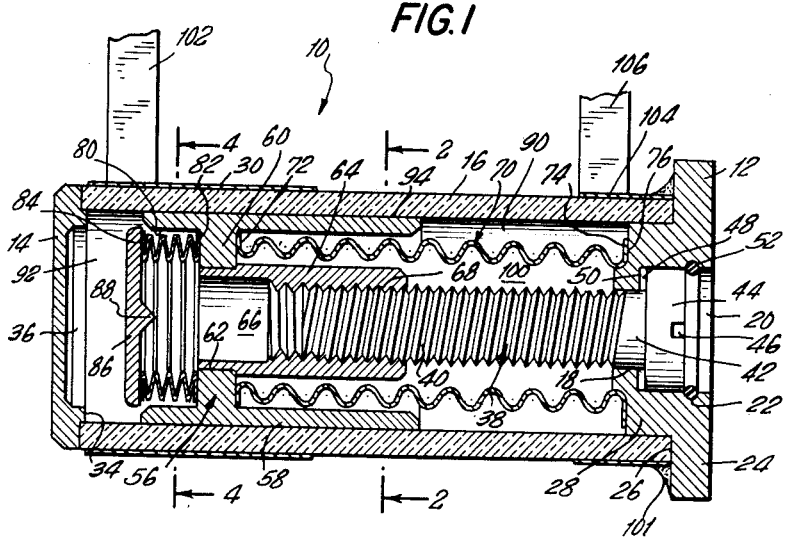
FIG. 1 is a longitudinal sectional view of an embodiment of a capacitor made in accordance with the concepts of the present invention.
Figure 2:
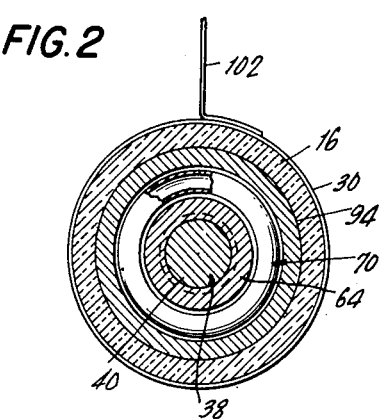
FIG. 2 is a transverse sectional view taken along the plane of line 2—2 in FIG. 1.
Figure 3:
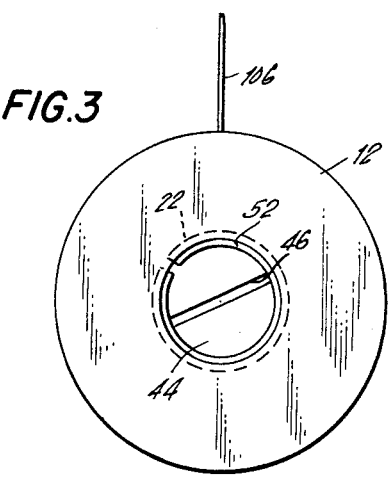
FIG. 3 is an end elevational view of the capacitor.
Figure 4:
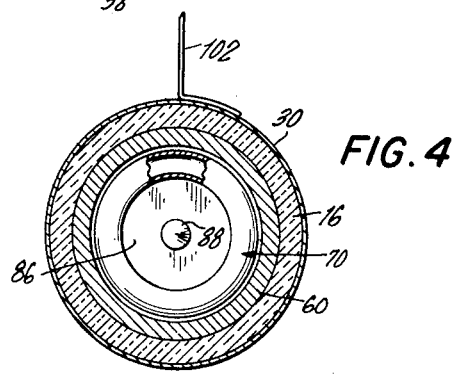
FIG. 4 is a transverse sectional view taken along the plane of line 4—4 in FIG. 1.

With continuing reference to the accompanying drawings, wherein like reference numerals designate similar parts throughout the various views, there is shown a capacitor 10 made in accordance with the invention and having a front end wall 12 and a rear end wall 14 which are bonded or otherwise secured to a cylinder 16.

The end wall 12 is provided with a central aperture 18 communicating with an outer bore or chamber 20. The end wall 12 also has a circular groove 22 therein opening into the bore 20. The end wall 12 is provided with a circumferential flange 24 which abuts against the front end 26 of the cylinder 16 and is provided with a tubular portion 28 which projects into the cylinder 16.

The hollow cylinder 16 is made of a dielectric material such as quartz, refractory glass, titania, or the like and is rigidly and concentrically attached to the end wall 12. A band 30 of a conductive material such as silver or the like, is fitted about the outer surface of cylinder 16 adjacent the rear end thereof and is secured to the outer surface of the cylinder by cementing. As an alternative the band 30 may be sprayed on the cylinder's surface and then fired.

The tubular portion 28 of the end wall 12 is inserted within the front open end of cylinder 16 and is secured therein. The aperture 18 and bore 20 therefore communicate with the interior of the cylinder 16. The end wall 12 is soldered at 101 to a silver band 104 which is coated or cemented on the cylinder 16.

The end wall 14 is preferably formed of Teflon or light insulative material and is provided with a short tubular portion 34 which fits into the cylinder 18 and is cemented thereto. The end wall 14 is provided with a recess 36 therein which communicates with the interior of the cylinder 16.

The capacitor also includes an adjusting member 38 formed of Teflon or the like and which includes a shank 40 which is externally threaded for the major part of its surface but which has a non-threaded portion 42 which rides in the aperture 18. The shank 40 terminates in an enlarged head 44 provided with a kerf or slot 46 for enabling a screw driver or other suitable tool to be used in rotating the head and thereby to rotate the adjusting member 38. A nylon washer 48 is disposed between the head 44 and the shoulder 50 which is formed in the end wall 14, which washer is adapted to serve as a thrust bearing. Locking means in the form of a split ring 52 formed of spring brass or steel is disposed in the groove 22 for the purpose of holding the adjusting member 38 against longitudinal movement. Thus, while the head 44 may be rotated, it is restrained from longitudinal movement by the washer 48 and split ring 52.

The capacitor 10 also includes a movable electrode designated generally by reference numeral 56. This piston type movable electrode 56 is slidable in the cylinder 16 along the inner surface thereof and comprises a cylindrical metal piston 58 formed of half-hard brass or the like. Integrally formed with the piston is a central web 60 having a bore 62 in which a hub 64 is press fitted and secured to the web 60 of the cylinder 58 against rotation. This hub is provided with a recess 66 in one end thereof, the other end being internally threaded as at 68 for threaded reception of the threaded shank 40 of the adjusting member 38.

A first bellows 70 is secured at the end 72 thereof to the web 60. The other end 74 of the bellows seats in a contoured portion 76 of the projection 28 and is secured to the front wall 12.

A second bellows 80 has its end 82 secured to the web 60. The other end 84 of the bellows 80 is secured to a bellows end plate 86 formed of nylon or like similar insulative material which is provided with an integrally formed conical projection 88 adapted to serve as a bearing. Both the bellows 70 and 80 are formed of a suitable material so as to be torsionally relatively rigid though longitudinally flexible with the bellows 70 serving to constrain the piston electrode 56 against rotation and permitting longitudinal movement only of the piston electrode 56 upon compression or expansion of the bellows 70.

The concentric space 90 about the bellows 70 and between the bellows 70 and the cylinder 16 is filled with an inert gas such as nitrogen. Likewise, the space 92 to the rear of the bellows 80 and between the bellows 80 and the cylinder 16 is filled with gas of an inert type such as nitrogen. This gas is at substantially atmospheric pressure and leakage of the gas may occur between the outer surface 94 of the piston electrode 56 and the cylinder 16 so that gas in the space 90 may leak into the space 92 and vice versa. The space 100 which is inwardly of the bellows 70 and 80 may be filled with air at atmospheric pressure or may be exhausted.

In the position of the capacitor shown in FIG. 1, the capacitor is in an intermediate position. Upon rotation of the adjusting member 38, by inserting a suitable tool into the kerf or slot 46 and rotating the tool, the piston electrode 56 may be slid into a position where the bellows plate 86 fits into the recess 36 in the end wall 14. In this position of the capacitor, the piston electrode 56 is in complete registry with the fixed electrode 30. This will constitute a position of maximum capacitance. A terminal 102 is connected to the fixed electrode 30 for connection to an operative electrical electronic circuit such a printed circuit. The piston electrode 56 is connected through the bellows 70 which may be formed of copper alloy or like material to the end wall 12 and thence through a conductor ring 104 and contact terminal 106 to an operative electrical or electronic circuit. Hence, upon rotation of the adjusting member 38, the piston electrode 56 can be moved into a position where the bellows 70 is compressed. This will move the piston electrode 56 at least partially out from under the piston electrode 38 to a position of approximately a middle range of capacitance. Further rotation of the adjusting member will cause the bearing 86 to contact the end of the shank 40 and to serve as a bearing for the end of said shank 40 whereupon the bellows 80 will thereafter be expanded equally upon the contraction of the bellows 70 equalizing somewhat the forces on the piston electrode 56 and eliminating entirely any backlash. The adjusting member 38 may be rotated until the piston electrode 56 is entirely without the confines of the piston electrodes 38 at which point the capacitor will be at a point of minimum capacitance.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A capacitor comprising a hollow cylinder provided with end walls, an adjusting member journalled in one of said end walls, said adjusting member having an externally-threaded portion extending longitudinally into said cylinder, a cylindrical piston electrode slidable in said cylinder and having an internally threaded bore receiving said threaded portion, a first bellows secured to said one of said end walls and to said piston electrode and surrounding the threaded portion of said adjusting member, a bellows plate, a second bellows secured to said bellows plate and at the other end to a face of said piston electrode opposite said one end wall and communicating with the threaded bore of said piston electrode, so that when said adjusting member is rotated and said piston electrode is moved to compress said first bellows, the threaded portion of said adjusting member will extend through said threaded bore and through the interior of said second bellows to engage said bellows plate to expand said second bellows.

2. A capacitor comprising a hollow cylinder provided with end walls, a fixed external electrode secured to said cylinder, an adjusting member journalled in one of said end walls, said adjusting member being of insulative material and having an externally-threaded portion extending longitudinally into said cylinder, a cylindrical piston electrode slidable in said cylinder and having an internally threaded bore receiving said threaded portion, said adjusting member being rotatable to drive said piston electrode axially therealong, first bellows means secured to said one of a surface of said end walls and to said piston electrode facing said one end wall, a bellows plate, second bellows means secured to said bellows plate and to a surface of said piston electrode facing away from said end wall, the interior of said second bellows means communicating with the threaded bore of said piston electrode, so that when said adjusting member is rotated and said piston electrode is moved to compress said first bellows means, said adjusting member will project through said threaded bore and extend through said second bellows means to engage said bellows plate to expand said second bellows means.

3. A capacitor comprising a hollow cylinder provided with end walls, a fixed external electrode secured to said cylinder, an adjusting member journalled in one of said end walls, said adjusting member having an externally-threaded portion extending longitudinally into said cylinder, a cylindrical piston electrode slidable in said cylinder and having an internally threaded bore receiving said threaded portion, a first bellows secured to said one of said end walls and to surface of said piston electrode facing said one end wall, said first bellows surrounding the threaded portion of said adjusting member and providing a gas-tight seal between said piston electrode and said one end wall, a bellows plate, a second bellows secured at one end to said bellows plate and at the other end to an opposite face of said piston electrode, said second bellows providing a gas-tight seal between said piston electrode and said bellows plate, the interior of said second bellows communicating with the threaded portion of said piston electrode so that when said adjusting member is rotated and said piston electrode is moved to compress said first bellows, the threaded portion of said adjusting member will project through said threaded bore and extend through the interior of said second bellows to engage said bellows plate to expand said second bellows, and an inert gas between said first bellows and said cylinder and between said second bellows and said cylinder.

4. A capacitor comprising a hollow cylinder provided with end walls, a fixed electrode on said cylinder, an adjusting member journalled in one of said end walls, said adjusting member being of an insulating material and having an externally-threaded portion extending longitudinally into said cylinder, a movable electrode slidable in said cylinder and having an internally threaded bore receiving said threaded portion, a first bellows secured to said one of said end walls and to a surface of said movable electrode facing said one end wall, a bellows plate having a bearing thereon, a second bellows secured at one end to said bellows plate and at the other end to an opposite surface of said movable electrode said second bellows having a hollow interior communicating with the threaded bore of said movable electrode and said bellows plate bearing being aligned with the axis of said adjusting member threaded portion so that when said adjusting member is rotated and said piston electrode is moved to compress said first bellows, the threaded portion of said adjusting member will project through said threaded bore and extend through the interior of said second bellows thereby engaging said bearing on said bellows plate to expand said second bellows and to balance some of the compressive stress on said first bellows.

5. A capacitor according to claim 4, including an inert gas disposed between said cylinder and said first bellows and said cylinder and said second bellows.

6. A capacitor according to claim 5 wherein said bellows plate and said bearing are integrally formed of nylon.

7. A capacitor according to claim 5 wherein said bellows plate and said bearing are integrally formed of nylon, and a gas filling of nitrogen disposed between said first and second bellows and said cylinder.

8. A capacitor comprising a hollow cylinder provided with end walls, a fixed electrode on said cylinder, an adjusting member journalled in one of said end walls, said adjusting member having an externally-threaded portion extending longitudinally into said cylinder, means secured to said one end wall for holding said adjusting member against axial movement, a cylindrical piston electrode slidable in said cylinder and having an internally threaded bore receiving said threaded portion, a first bellows secured to said one of said end walls and to a surface of said piston electrode facing said one end wall, a bellows plate, a second bellows secured at one end to said bellows plate and at the other end to an opposite surface of said piston electrode, said second bellows having a hollow interior communicating with the threaded bore of said piston electrode so that when said adjusting member is rotated and said piston electrode is moved to compress said first bellows, said adjusting member will project through said threaded bore and extend through the interior of said second bellows thereby engaging said bellows plate to expand said second bellows, the other of said end walls having a recess therein for receiving said bellows plate.

References Cited in the file of this patent

UNITED STATES PATENTS

| | | |
|---|---|---|
| 2,575,726 | Peck | Nov. 20, 1951 |
| 2,740,926 | Jennings | Apr. 3, 1956 |
| 2,899,612 | Jennings | Aug. 11, 1959 |
| 2,899,613 | Jennings | Aug. 11, 1959 |
| 2,904,845 | Sperry | Sept. 22, 1959 |
| 2,984,776 | Barnes | May 16, 1961 |
| 3,071,716 | Young | Jan. 1, 1963 |